US010113025B2

(12) United States Patent
Duerr et al.

(10) Patent No.: US 10,113,025 B2
(45) Date of Patent: Oct. 30, 2018

(54) FUNCTIONALIZED KETONE-ALDEHYDE CONDENSATION RESINS

(71) Applicant: Evonik Degussa GmbH, Essen (DE)

(72) Inventors: Christoph Juergen Duerr, Dorsten (DE); Bettina Burian, Dorsten (DE); Daniel Engelke, Dorsten (DE); Michael Ewald, Marl (DE); Tanja Joerres, Huenxe (DE); Erika Retzlaff, Marl (DE)

(73) Assignee: Evonik Degussa GmbH, Essen (DE)

( * ) Notice: Subject to any disclaimer, the term of this patent is extended or adjusted under 35 U.S.C. 154(b) by 189 days.

(21) Appl. No.: 15/089,745

(22) Filed: Apr. 4, 2016

(65) Prior Publication Data
US 2016/0289366 A1 Oct. 6, 2016

(30) Foreign Application Priority Data

Apr. 2, 2015 (EP) .................................... 15162343

(51) Int. Cl.
*C08G 6/02* (2006.01)
*C09D 161/02* (2006.01)
*C08G 18/54* (2006.01)
*C09D 5/02* (2006.01)
*C09D 17/00* (2006.01)
*C08G 12/06* (2006.01)
*C09B 67/46* (2006.01)
*C08G 18/75* (2006.01)
*C09D 175/04* (2006.01)
*C08G 4/00* (2006.01)
*C08G 16/02* (2006.01)
*C09D 159/00* (2006.01)
*C09D 161/00* (2006.01)
*C09D 161/22* (2006.01)

(52) U.S. Cl.
CPC .............. *C08G 6/02* (2013.01); *C08G 4/00* (2013.01); *C08G 12/06* (2013.01); *C08G 16/0225* (2013.01); *C08G 18/548* (2013.01); *C08G 18/755* (2013.01); *C09B 67/009* (2013.01); *C09D 5/027* (2013.01); *C09D 17/00* (2013.01); *C09D 159/00* (2013.01); *C09D 161/00* (2013.01); *C09D 161/02* (2013.01); *C09D 161/22* (2013.01); *C09D 175/04* (2013.01)

(58) Field of Classification Search
CPC ................. C08G 6/02; C09D 161/02
USPC ................... 524/592; 528/242, 222
See application file for complete search history.

(56) References Cited

U.S. PATENT DOCUMENTS

| 2,309,088 | A | * | 1/1943 | Auer | .......................... | C09F 1/00 204/157.63 |
|---|---|---|---|---|---|---|
| 2,540,885 | A | | 2/1951 | Hurst et al. | | |
| 2,540,886 | A | | 2/1951 | Hurst et al. | | |
| 3,122,523 | A | * | 2/1964 | Josten | ....................... | C08G 6/02 525/521 |
| 3,329,654 | A | | 7/1967 | Schwarzhans | | |
| 3,784,514 | A | * | 1/1974 | Tiedeman | ................ | C08G 6/00 525/481 |
| 3,784,515 | A | * | 1/1974 | Freeman | .................. | C08G 8/28 156/331.3 |
| 3,806,491 | A | * | 4/1974 | Gardikes | ................. | B22C 1/224 523/144 |
| 3,880,694 | A | * | 4/1975 | Freeman | .................. | C08G 8/28 156/331.3 |
| 3,947,425 | A | * | 3/1976 | Freeman | .................. | C08G 8/16 428/528 |
| 3,970,729 | A | | 7/1976 | Walsh et al. | | |
| 4,033,914 | A | | 7/1977 | Bovier et al. | | |
| 4,219,508 | A | | 8/1980 | Wagner | | |
| 4,221,876 | A | | 9/1980 | Wagner | | |
| 4,301,310 | A | | 11/1981 | Wagner | | |
| 4,379,862 | A | | 4/1983 | Wagner | | |
| 4,585,853 | A | * | 4/1986 | Plank | ....................... | C08G 6/02 528/220 |
| 4,731,434 | A | | 3/1988 | Dorffel | | |
| 7,723,493 | B2 | | 5/2010 | Lei et al. | | |
| 2005/0124716 | A1 | | 6/2005 | Gloeckner et al. | | |
| 2008/0262144 | A1 | * | 10/2008 | Glockner | ............... | C08G 18/54 524/556 |
| 2009/0198024 | A1 | | 8/2009 | Gloeckner et al. | | |

(Continued)

FOREIGN PATENT DOCUMENTS

CN 101220129 A 7/2008
DE 870 022 3/1953
(Continued)

OTHER PUBLICATIONS

Extended European Search Report dated Sep. 18, 2015 in Patent Application No. 15162343.6 (with English Translation of Categories of Cited Documents).
Extended European Search Report dated Aug. 4, 2016 in Patent Application No. 16162178.4 (with English Translation of Categories of Cited Documents).
Thomas Laue et al., "Named Organic Reactions, Aldol Reaction", John Wiley & Sons, 2005, Edition 2, pp. 4-10 and Cover pages.
Thomas Laue et al., "Named Organic Reactions, Michael Reaction", John Wiley & Sons, 2005, Edition 2, pp. 201-204 and Cover pages.
"Fungizide bis Holzwerkstoffe", Ullmanns Encyklopädie der technischen Chemie, Band 12, 1976. pp. 547-555 (with cover page).

*Primary Examiner* — Jane L Stanley
(74) *Attorney, Agent, or Firm* — Grüneberg and Myers PLLC

(57) ABSTRACT

A functionalized ketone-aldehyde condensation resin is produced by condensing a ketone and an aldehyde in the presence of at least one alcohol or alkoxylate thereof, wherein the alcohol comprises amino alcohols and derivatives thereof, hydroxybutyl vinyl ether, OH-functional acrylates, OH-functional terpenes, OH-functional halogen compounds, hydroxycarboxylic acids, sulphur-containing alcohols, hydroxyl-containing urea derivatives, carbohydrates, siloxanes, OH-functional phosphorus compounds or unsaturated alcohols.

11 Claims, No Drawings

(56) References Cited

U.S. PATENT DOCUMENTS

2010/0197858 A1    8/2010  Cavaleiro et al.
2013/0303740 A1  11/2013  Gärtner et al.
2015/0240020 A1    8/2015  Veit et al.

FOREIGN PATENT DOCUMENTS

| | | |
|---|---|---|
| DE | 1 155 909 | 10/1963 |
| DE | 1 256 898 | 12/1967 |
| DE | 1 300 256 | 7/1969 |
| DE | 101172 | 10/1973 |
| DE | 25 32 161 | 2/1976 |
| DE | 33 24 287 | 1/1985 |
| DE | 27 21 186 C2 | 4/1986 |
| DE | 103 38 560 | 3/2005 |
| DE | 10 2006 026 758 A1 | 1/2008 |
| DE | 10 2007 018 812 A1 | 10/2008 |
| EP | 2 910 584 A1 | 8/2015 |
| GB | 557046 | 11/1943 |
| GB | 779092 | 7/1957 |
| GB | 1101587 | 1/1968 |
| GB | 1166516 | 10/1969 |
| GB | 1 295 829 | 11/1972 |
| JP | 5-179215 A | 7/1993 |
| WO | 2012/020028 | 2/2012 |

\* cited by examiner

US 10,113,025 B2

FUNCTIONALIZED KETONE-ALDEHYDE CONDENSATION RESINS

BACKGROUND OF THE INVENTION

Field of the Invention

The invention relates to a functionalized ketone-aldehyde condensation resin, to the preparation thereof and to the use thereof.

Discussion of the Background

It is known that ketones or mixtures of ketones and aldehydes can be converted in the presence of basic catalysts or acids to resinous products. For instance, it is possible to prepare resins from mixtures of cyclohexanone and methylcyclohexanone. The reaction of ketones and aldehydes usually leads to hard resins which often find use in the coatings industry.

Ketone-aldehyde resins of industrial significance are nowadays usually prepared using formaldehyde. Ketone-formaldehyde resins of this kind have already been known for a long time. Processes for preparation thereof are described, for example, in DE 33 24 287, U.S. Pat. No. 2,540,885, U.S. Pat. No. 2,540,886, DE 11 55 909, DE 13 00 256 and DE 12 56 898.

Preparation is normally accomplished by reacting ketones and formaldehyde with one another in the presence of bases.

Ketone-aldehyde resins are used in coating materials, for example, as film-forming added components, in order to improve particular properties such as initial drying rate, shine, hardness or scratch resistance. Because of their relatively low molecular weight, standard ketone-aldehyde resins have low melt and solution viscosity and therefore serve as film-forming functional fillers, inter alia, in coating materials.

The systems known from the related art have the disadvantage that no broad introduction of chemical functionalities in the resin body is possible. Resin-bound hydroxyl or carboxyl functionalities are said to have bonding properties, for example. Resin-bound amines, in contrast, can lead to a distinct increase in colour intensity compared to amine-free systems by virtue of their high pigment affinity. The drawback in the preparation of functional resin systems is that functionalization of the resins usually has to be conducted in at least one further step which follows the actual condensation reaction. A frequently used means of subsequent further conversion is a two-stage process in which the keto groups in typical ketone-aldehyde condensation resins are first converted to hydroxyl functionalities by hydrogenation. Thereafter, it is then possible to conduct a reaction of the hydroxyl groups with appropriately functionalized reactive components. Suitable reactive components here are typically compounds which can react with OH functions in a manner known to those skilled in the art, such as isocyanates, carbodiimides, carboxylic acids, inter alia. One route for preparation of double bond-functional ketone resins is described, for example, in DE10338560. In addition, DE 102007018812 describes the introduction of polyethers into ketone-aldehyde condensation resins by conducting, after a hydrogenation of the ketone-aldehyde condensation resins, a reaction of the carbonyl-hydrogenated ketone-aldehyde condensation resins with oxiranes.

An alternative method used for functionalization of ketone-aldehyde condensation resins in one process step is the incorporation of chemical functionalities into ketone-aldehyde condensation resins via the use of appropriately functionalized ketones. However, these are usually more difficult to obtain than the correspondingly functionalized alcohols and are usually higher in terms of raw material costs, which is often undesirable from a market point of view.

SUMMARY OF THE INVENTION

It was an object of the present invention to provide ketone-aldehyde resins having a broadened spectrum of use.

In one embodiment, the present invention relates to a process for preparing a functionalized resin, comprising:
condensing a ketone and an aldehyde in the presence of at least one alcohol or the alkoxylate thereof,
wherein the alcohol comprises a member selected from the group consisting of an amino alcohol, a compound which is obtained from an amino alcohol, hydroxybutyl vinyl ether, an OH-functional acrylate, an OH-functional terpene, an OH-functional halogen compound, a hydroxycarboxylic acid, a sulphur-containing alcohol, a compound which is obtained from a hydroxyl-containing urea, a carbohydrate, a siloxane, an OH-functional phosphorus compound, an unsaturated alcohol and mixtures thereof.

In another embodiment, the present invention relates to a functionalized resin, obtained by the above process.

The present invention further relates to a coating, comprising:
the above functionalized resin.

Moreover, the present invention relates to a paint, a varnish or a pigment paste, comprising: the above functionalized resin.

DETAILED DESCRIPTION OF THE INVENTION

It has been found that, surprisingly, controlled modification of ketone-aldehyde resins is possible when appropriate reaction components are present in the reaction and the corresponding reaction conditions are observed.

Accordingly, the present invention firstly provides processes for preparing functionalized resins, comprising the condensation of aliphatic ketones and aldehydes in the presence of at least one alcohol, wherein the alcohol is incorporated covalently into the resin.

The invention allows the (in situ) functionalization of ketone-aldehyde resins through the use of appropriate modifiers, especially through the use of alcohols during the synthesis. According to the related art, functionalizations have been conducted to date in steps which follow the condensation. These steps include, for example, reaction of OH groups obtained by hydrogenation of the keto groups with appropriately functionalized isocyanates. The present invention, in contrast, allows a reduction in process steps compared to conventional processes. This also brings further advantages from a process technology point of view, such as higher space-time yields, and also advantages from an application point of view, since it is possible to match not only the type of functionality to be introduced but also the amount specifically to the application.

Contrary to assumptions to date, it has been found that, surprisingly, it is indeed possible to incorporate further constituents, especially alcohols, into the polymer chain during the synthesis of ketone-aldehyde condensation resins. Without being bound to this assumption, it is assumed that the incorporation takes place via a Michael addition mechanism. The mechanistic description is known to those skilled in the art and can be found in the relevant specialist literature under aldol condensation/Michael addition, for example in Laue/Plagens, Named Organic Reactions, John Wiley & Sons, 2005, Edition 2, pages 4 ff. and pages 201 ff. Vinyl ketones formed by the condensation of ketone and formaldehyde, in an alkaline environment, offer an opportunity for an OH-functional compound to attack (shown here by the example of a methyl isobutyl ketone-based resin):

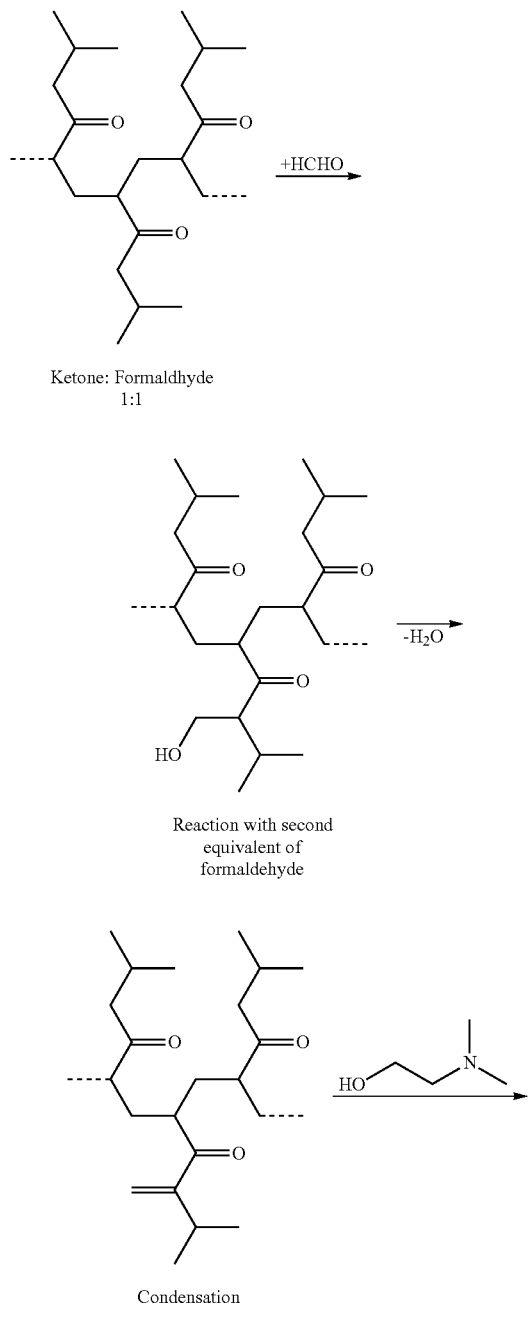

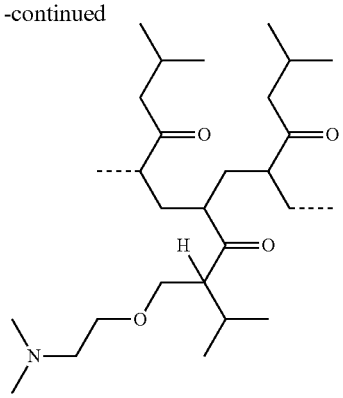

Addition of N,N-dimethylaminoethanol

Through the use of appropriately functionalized alcohols, the technology described thus allows the (in situ) functionalization of ketone-aldehyde resins.

Suitable aldehydes for preparation of the inventive condensation resins are unbranched or branched aldehydes, preferably selected from the group consisting of formaldehyde, acetaldehyde, n-butyraldehyde and/or isobutyraldehyde, valeraldehyde and dodecanal, or mixtures thereof. In a particularly preferred embodiment, formaldehyde is present as aldehyde in the inventive resins, either alone or in mixtures with the aforementioned aldehydes. It is also possible to use a formaldehyde donor such as trioxane or paraformaldehyde, preference being given to the use of paraformaldehyde. The formaldehyde required may also be used, for example, as an about 20% to 40% by weight aqueous or alcoholic (e.g. methanol or butanol) solution. In the context of the present invention, it is especially also possible to use different forms of formaldehyde, for example a combination of paraformaldehyde and a solution.

Suitable ketones for preparation of the inventive condensation resins are in principle all the CH-acidic ketones known from the literature or mixtures thereof. It is a prerequisite for the ketones usable in the process according to the invention that there is an opportunity for binding to the polymer chain formed in the condensation and at the same time an opportunity for reaction with formaldehyde/alcohol, for example, in the same molecule. Following the postulate of the Michael addition, the ketone used should have at least two and preferably more CH-acidic protons. This achieves the effect that the ketone can react at least twice with formaldehyde. Preferably, the ketone has three C—H-acidic protons on one side of the keto group or at least two C—H-acidic protons on each side of the keto group.

Examples of suitable ketones are acetone, acetophenone, ortho-, meta- or para-phenylacetophenone, methyl ethyl ketone, 3-pentanone, 2-heptanone, 3-heptanone, 4-heptanone, 2-octanone, 3-octanone, 2-undecanone, 5-methylhexan-2-one (methyl isoamyl ketone) or 4-methylpentan-2-one (methyl isobutyl ketone), cyclopentanone, cyclododecanone, mixtures of 2,2,4- and 2,4,4-trimethylcyclopentanone, cycloheptanone, cyclooctanone, cyclohexanone, o-, m- or p-methoxyacetophenone, o-, m- or p-[N,N-dialkylaminophenyl]ethanone, rheosmin, 4-(4-hydroxy-3-methoxyphenyl)-2-butanone, levulinic acid and derivatives thereof and alkyl-substituted cyclohexanones such as 4-tert-amylcyclohexanone, 2-sec butylcyclohexanone, 2-tert-butylcyclohexanone, 4-tert-butylcyclohexanone, 2-methylcyclohexanone and 3,3,5-trimethylcyclohexanone or diones, for example acetylacetone. Said ketones may also be present in the form of mixtures.

In addition, ketone components used may also be the adducts referred to as Schiff bases, which are obtained from the reaction of ketones and primary amines. The primary amines used may themselves contain further organic radicals or functionalities, for example amines. Compounds of this kind are described, for example, in U.S. Pat. No. 7,723,493 or WO2012020028.

Especially preferably, the ketones are selected from the group consisting of acetone, methyl ethyl ketone, 2-heptanone, 3-heptanone, 4-heptanone, 2-octanone, 3-octanone, 2-undecanone, 5-methylhexan-2-one (methyl isoamyl ketone) and 4-methylpentan-2-one (methyl isobutyl ketone), or mixtures thereof.

In the context of the present invention, it has been found that a ketone present at one chain end of the polymer is sufficient in principle to achieve single functionalization (one functionality per chain end), shown below by the example of a formaldehyde/acetophenone resin:

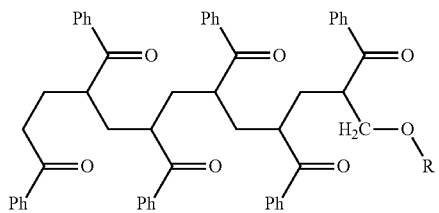

In contrast, in the case of 4-methylpentan-2-one (methyl isobutyl ketone), for example, functionalization is also possible along the polymer chain and hence not just at the chain ends:

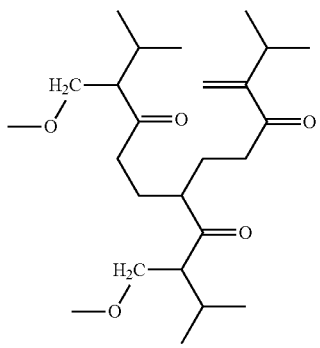 [SMILES: C=C(C(=O)CCC(CCC(=O)C(COC)C(C)C)C(=O)C(COC)C(C)C)C(C)C]

The process of the present invention thus allows individual functionalization matched to the needs of the product. Thus, according to the choice of components used, functionalization can be achieved at the chain ends and/or along the polymer chain. If an increase in molecular weight is to be achieved at the same time as the functionalization along the polymer chain in the process according to the invention, preference is given to using superstoichiometric amounts of aldehyde, especially of formaldehyde, in the process according to the invention.

The range for the molar aldehyde to ketone ratio in the context of the present invention is generally in the range from 1:1 to 3.5:1, preferably in the range from 1.1:1 to 2.5:1.

In the synthesis of the ketone-aldehyde resins, a further component used may also be urea and/or derivatives thereof as component, such that functionalized ketone-aldehyde-urea resins are obtained.

A further essential constituent in the process according to the invention is the alcohols used during the condensation and for functionalization of the ketone-aldehyde resins. Alcohols in the context of the present invention are understood to mean all compounds having at least one OH group, compounds of both low and high molecular weight being suitable.

Especially suitable are saturated or unsaturated, aliphatic or cycloaliphatic and aromatic mono-, di- or polyols. In the case of polyols having n OH groups, 0 to n−1 of the OH groups may be used for derivatization or may already have been derivatized, for example by reaction with isocyanates, carboxylic acids or derivatives thereof.

Furthermore, linear or branched OH-functional (bio)polymers are suitable, such as the following examples having linear or branched OH groups: polyesters, polyethers, polyurethanes, polyacrylates, polymethacrylates, polyvinyl alcohols, poly(butadienes), functionalized silicone resins, (organofunctionalized) siloxanes, carbohydrates or sugars.

Examples of aliphatic and cycloaliphatic alcohols are especially methanol, ethanol, propanol, isopropanol, butanol, 2-butanol, isobutanol, tert-butanol, 1-pentanol, 2-pentanol, 2-hexanol, tert-amyl alcohol, cyclohexanol, methoxycyclohexanol, 1-phenylethanol, glyceryl carbonate.

Examples of unsaturated alcohols are especially allyl alcohol, vinyl alcohol, 2-allyloxyethanol, hexenols (e.g. 2-hexen-1-ol, 3-hexen-1-ol), prenol, but-2-ene-1,4-diol, sorbyl alcohol, propargyl alcohol, but-2-yne-1,4-diol, hex-3-yne-2,5-diol, 1-ethynyl-1-cyclohexanol, 2-m ethylbut-3-yn-2-ol, but-3-yn-2-ol or 4-ethyl oct-1-yn-3-ol.

Examples of aromatic alcohols are especially phenols, catechols, pyrogallol and derivatives thereof or hydroquinone.

Ethylene glycol, 1,3-propylene glycol, 1,2-propylene glycol, pentane-1,2-diol, butane-1,4-diol, pentane-1,5-diol, 2,5-dimethylhexane-2,5-diol, butane-2,3-diol, hexane-1,6-diol (HDO® from BASF SE), neopentyl glycol hydroxypivalate, neopentyl glycol, 2,2,4-trimethyl-1,3-pentanediol, cyclohexanedimethanol, 3-hydroxy-2,2-dimethylpropyl 3-hydroxy-2,2-dimethylpropanoate, hydroquinone, benzene-1,4-dimethanol, bisphenols, but also trimethylolpropane, glycerol, ditrimethylolpropane, pentaerythritol, 2,2,6,6-tetrakis(hydroxymethyl)-4-oxaheptane-1,7-diol, 2,2-bis[[3-hydroxy-2,2-bis(hydroxymethyl)propoxy]methyl]propane-1, 3-diol, oligo- or polyglycerol are examples of suitable diols or polyols, as are all derivatives derived from the diol/polyol, for example esters/ethers/urethanes.

In the case of polyesters having linear or branched OH groups, these may be saturated or unsaturated and may be based on aliphatic, cycloaliphatic and/or aromatic starting constituents. Mixed systems in any ratios are also possible.

Polyethers are commercially available in a wide variety, for example under the Pluriol® (BASF SE) or Polyglycol AM® (Clariant) brand names.

In addition, dendritic and branched polyols are suitable, for example the Boltorn™ P500 or Boltorn™ H2004 products from Perstorp or various Capa™ products from Perstorp.

Preferred polyethers may have single, double or, in the case of glycerol-started polyethers, triple OH termination, or may have been provided with at least one OH functionality and further double or multiple bonds. It is also possible to use butyne-1,4-diol-started polyethers. It is further conceivable that at least one OH terminus in polyether diols and triols has been selectively provided with an end cap, for instance by a methylation, esterification or isocyanate end-capping.

Formula (I) describes preferred polyethers

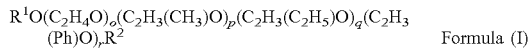

where $R^1$ and $R^2$ are each independently hydrogen or identical or different organic radicals which may in turn contain an OH functionality, heteroatoms and/or multiple bonds.

o=0 to 200, preferably 0 to 150, more preferably 0 up to 100, especially preferably 0 up to 80, p=0 to 200, preferably 0 to 150, more preferably 0 to 100, especially preferably 0 up to 80, q=0 to 200, preferably 0 to 150, more preferably 0 to 100, especially preferably 0 up to 80, r=0 to 200, preferably 0 to 150, more preferably 0 to 100, especially preferably 0 up to 80, with the proviso that o+p+q+r≥2

As well as the polyethers based on the polymerization of epoxides and the variety that results therefrom in terms of the topology and monomer distribution over the polymer chain, other suitable polyethers are the linear or branched polyethers having OH groups which are obtainable by the ring-opening polymerization of cyclic ethers, for example those which are based on THF and are commercially available, for example PolyTHF® 1000 or PolyTHF® 1000S, PolyTHF® 1400, PolyTHF® 1800, PolyTHF® 2000, PolyTHF® 2000 S, PolyTHF® 250, PolyTHF® 650 S (BASF SE).

Examples of suitable linear or branched polyurethanes having OH groups, which are also referred to as "thermoplastic polyurethanes" (TPUs), are commercially available inter alia as Epamould, Epaline for extrusion, Epacol for adhesives, Pakoflex for Synthetic Leather (EPAFLEX), Elastollan (BASF SE & Elastogran), Pearlthane (Merquinsa, now part of Lubrizol), Desmopan (Bayer), Estane (Lubrizol), Pellethane (Lubrizol), New Power® (New Power Industrial Ltd.), Irogran (Huntsman), Exelast EC (Shin-Etsu Polymer Europe B.V.), Laripur (COIM SpA), Avalon (Huntsman), Zythane (Alliance Polymers & Services)

Suitable polyvinyl alcohols are, for example, those having a neutralization level of 1%-100% (based on preparation from polyvinyl acetate). Products of this kind are commercially available, for example, under the Alcotex (from Synthomer) or Elvanol® (DuPont™) name.

Suitable carbohydrates or sugars are especially saccharides and polysaccharides, for example glucose, fructose, starch, amylopectin, amylose, chitosan.

Further examples of suitable alcohols in the process according to the invention are hydroxybutyl vinyl ethers and alkoxylates thereof, OH-functional acrylates, for example hydroxyethyl acrylate, hydroxyethyl methacrylate, OH-functional terpenes, for example citronellol, dolichol, phytol, geraniol, farnesol, linalool, bisabolol, but also terpineols, aliphatic, cycloaliphatic or aromatic OH-functional halogen compounds, for example ethylenechlorohydrin, 1-(pyrid-3-yl)-2-chloroethanol, 2-chloro-1-(3-chlorophenyl) ethanol, 2-chloro-1-(3-hydroxyphenyl)ethanol, polyfluorinated alcohols. In addition, sulphur compounds are also suitable, for example 2,2'-thiobisethanol, mercaptoethanol, but also amino alcohols and derivatives, for example amides. Examples of these are N,N-dimethylaminoethanol (e.g. Lupragen® N 101), trimethylaminoethylethanolamine, 3-dimethylaminopropan-1-ol, butyldiethanolamine, butyle-thanolamine, dibutylethanolamine, diethylethanolamine, ethylethanolamine, dimethylaminoethoxyethanol (sold by BASF SE under the Lupragen® N 107 name), methyldiethanolamine, N,N-dimethylisopropanolamine, N-methylethanolamine, diethanolamine, triethanolamine, diisopropanolamine, triisopropanolamine, N-(2-hydroxyethyl) piperidine, diisopropanol-p-toluidine, N,N-di(2-hydroxyethyl)aniline, N-(2-hydroxyethyl)aniline, 2-(2-aminoethoxy)ethanol, 3-amino-1-propanol, 5-amino-1-pentanol, monoethanolamine, N-(2-aminoethyl) ethanolamine, isopropanolamine or 2,2'-(phenyl amino) diethanol. Corresponding cyclic derivatives are especially selected from the group of the piperazines and morpholines, for example 1-(2-hydroxyethyl)piperazine or 4-(2-hydroxyethyl)morpholine. Additionally suitable are hydroxy-containing urea derivatives, for example N-(2-hydroxyethyl) ethyleneurea or hydroxycarbamide.

Phosphoric esters having a further free OH functionality are a further group of usable alcohols; for example, OH-functional phosphorus compounds of the following structure are usable:

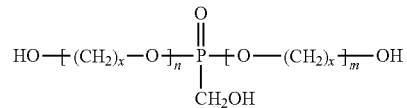

Phosphorus-containing alcohols of this kind are described, for example, in DE 2532161. A further example is the phosphorus polyol Exolit OP550 from Clariant. Organic phosphoric esters containing, inter alia, alkoxylated fatty alcohols as mono-/diol component are also sold under the Silaphos® (Schill+Seilacher GmbH) trade name and are suitable, inter alia, for use as flame retardant or wetting agent, corrosion inhibitor, antistat or emulsifier.

Further suitable alcohols are also compounds containing carboxyl groups, for example from the group of the hydroxycarboxylic acids, for example lactic acid, 2-hydroxymethylbutyric acid, 2-hydroxymethylhexanoic acid, 2-hydroxymethylpropanoic acid. Aromatic representatives such as mandelic acid and derivatives thereof (e.g. p-methylmandelic acid) or hydroxybenzoic acids (e.g. gallic acid) should also be mentioned by way of example at this point.

Additionally suitable are hydroxy-containing amino acids, salts thereof and the corresponding esters or amides thereof. In the case of the latter two, hydrolysis can take place under the basic conditions of the ketone-aldehyde condensation.

Additionally suitable are also alkoxylates of the aforementioned alcohols. Alkoxylates of the alcohols may be obtained, for example, by reaction of alcohols with oxiranes or mixtures of various oxiranes in the presence of basic or acidic catalysts or with the aid of double metal cyanide catalysts. Suitable non-functional oxiranes that should be mentioned by way of example are ethylene oxide, propylene oxide, butylene oxide or styrene oxide, while functional oxiranes usable as reactive diluent are also glycidyl ethers such as allyl glycidyl ether (AGE), glycidyl (meth)acrylate, or the (mono-)functional glycidyl ethers sold by ipox Chemicals GmbH. In addition, alkoxy-functional oxiranes such as Dynasylan® GLYMO or GLYEO or chloromethylene-functional oxiranes, for example epichlorohydrin, can also be converted to the corresponding polyethers in the manner of an alkoxylation under the suitable catalytic conditions and are usable in the context of the invention.

In a further embodiment of the process according to the invention, the ketone itself may also be OH-functionalized, for example in the case of use of hydroxyacetone.

Further conceivable OH-functionalized ketones may be 4-hydroxy-4-methyl-2-pentanone, 4-hydroxy-2-butanone, 4-hydroxy-3-methyl-2-butanone, 4-hydroxy-2-pentanone, 4-hydroxy-3-(hydroxymethyl)-2-butanone, 1-hydroxy-3-pentanone, 3,4-dihydroxy-2-butanone, 1-hydroxy-2-propanone, 1,3-dihydroxy-2-propanone, 1-hydroxy-2-butanone, rheosmin, acetoin, 2'-hydroxyacetophenone, 3'-hydroxyacetophenone, 4'-hydroxyacetophenone.

Alternatively, the OH functionality can be released in the course of performance of the reaction, for example in the case of use of cyclic esters, for example lactones, which can in turn be functionalized along the carbon skeleton. In this case, the lactone is ring-opened in situ and the OH functionality is attacked.

Further suitable alcohols are based on nitro compounds, for example 1-(3-nitrophenyl)propanol, or oximes, for example 1-phenylethylhydroxylamine, but also on natural products, for example ascorbic acid, maltitol, kojic acid (from fungi), phytol (from chlorophyll), terpenoids, lignin, ricinoleic acid and esters thereof.

Organofunctionalized siloxanes, for example those which have been provided with a hydroxyalkyl functionality or polyether modification, may also be regarded as alcohols in the context of the present invention.

Siloxane polymers of this kind are obtainable by a reaction of compounds of the formula (II)

$$M_a M^H_b D_c D^H_d T_e Q_f \quad \text{Formula (II)}$$

where
$M = [R^3_3 SiO_{1/2}]$
$M^H = [R^3_2 SiHO_{1/2}]$
$D = [R^3_2 SiO_{2/2}]$
$D^H = [R^3 SiHO_{2/2}]$
$T = [R^3 SiO_{3/2}]$
$Q = [SiO_{4/2}]$,
a=0 to 50, preferably 0 to 20, especially preferably 0 to 2,
b=0 to 50, preferably 0 to 20, especially preferably 0 to 2,
c=0 to 600, preferably 0 to 400, more preferably 0 to 200, especially preferably 0 to 80,
d=0 to 50, preferably 0 to 25, more preferably 0 to 15, especially preferably 0 to 10,
e=0 to 30, preferably 0 to 20, especially preferably 0 to 10,
f=0 to 20, preferably 0 to 10, especially preferably 0,
with the proviso that a+b+c+d≥2,
$R^3$ are independently identical or different alkyl radicals having 1 to 30 carbon atoms, or identical or different aryl radicals having 6 to 30 carbon atoms or identical or different —OH or —OR$^4$ radicals, preferably methyl, phenyl, —OH or —OR$^4$, especially methyl or phenyl,
$R^4$ are independently identical or different alkyl radicals having 1 to 12 carbon atoms, or identical or different aryl radicals having 6 to 12 carbon atoms, preferably methyl, ethyl, n-propyl, isopropyl, n-butyl, sec-butyl, isobutyl, phenyl, especially methyl or phenyl,
with compounds of the formula (III) and/or formula (IV) and/or polyethers of the formula (V) in the manner of a hydrosilylation $$H_2C=CH-R^5 \quad \text{Formula (III)}$$

$$HCC-R^5 \quad \text{Formula (IV)}$$

with R$^5$=alkyl radicals which have 1 to 30 carbon atoms and may also be interrupted by heteroatoms or alkyl radicals having 6 to 30 carbon atoms or —OH, preferably —OH or —OR$^6$, especially methyl or phenyl,
$R^6$ are independently identical or different alkyl radicals having 1 to 12 carbon atoms, or identical or different aryl radicals having 6 to 12 carbon atoms, preferably methyl, ethyl, n-propyl, isopropyl, n-butyl, sec-butyl, isobutyl, phenyl, especially methyl or ethyl.

Preferred compounds corresponding to the formula (III) or (IV) are compounds having terminal double bonds, for example alpha-olefins, alpha,omega-olefins, mono- or polyols bearing allyl groups or aromatics bearing allyl groups. Especially preferred compounds corresponding to the formula (III) or (IV) are ethene, ethyne, propene, 1-butene, 1-hexene, 1-dodecene, 1-hexadecene, 1,3-butadiene, 1,7-octadiene, 1,9-decadiene, styrene, eugenol, allylphenol, methyl undecylenoate, allyl alcohol, allyloxyethanol, 1-hexen-5-ol, allylamine, propargyl alcohol, propargyl chloride, propargylamine or butyne-1,4-diol.

Preferred polyethers having one or more multiple bonds are, for example, allyl-functional polyethers. Particularly preferred polyethers having carbon-carbon multiple bonds are preferably those of the formula (V)

$$CH_2=CHCH_2O(C_2H_4O)_o(C_2H_3(CH_3)O)_p(C_2H_3(C_2H_5)O)_q(C_2H_3(Ph)O)_rR^7 \quad \text{Formula (V)}$$

where
$R^7$ is an organic radical having no multiple bond amenable to hydrosilylation or hydrogen, preferably hydrogen, alkyl radicals or carboxyl radicals, more preferably hydrogen, methyl, butyl or acetyl, especially preferably hydrogen,
o=0 to 200, preferably 0 to 150, more preferably 0 to 100, especially preferably 0 to 80,
p=0 to 200, preferably 0 to 150, more preferably 0 to 100, especially preferably 0 to 80,
q=0 to 100; preferably 0 to 30, more preferably 0 to 15; especially preferably 0,
r=0 to 100; preferably 0 to 30, more preferably 0 to 15; especially preferably 0.

As well as the use of individual alcohols, it is also possible to use mixtures of different alcohol components. Rather than the alcohols, it is also possible to use thiols.

Preferably, the alcohols methanol, ethanol and polyvalent alcohols having 2 to 6 carbon atoms and/or phenol are ruled out as sole alcohols. However, said alcohols may indeed be present in combination with further alcohols.

In a further preferred embodiment, amino alcohols, unsaturated alcohols which may optionally contain heteroatoms, phosphoric esters, siloxanes, polyols having at least 7 carbon atoms, saturated or unsaturated hydroxycarboxylic acids, OH-functional acrylates, OH-functional polymers and/or mixtures thereof may be used as alcohols in the process according to the invention.

In a very particularly preferred embodiment, N,N-dimethylaminoethanol, 2-allyloxyethanol, 5-hexen-1-ol or 2-propen-1-ol are used as alcohols.

Typically, 0.1 to 10 mol of alcohol are used per mole of ketone, preferably 0.2 to 5 mol of alcohol per mole of ketone.

For resin synthesis, all known processes may be employed. Typically, condensation is effected in the presence of alkaline catalysts at temperatures between 40 and 120° C. Such reactions are described, for example, in Ullmann's Encyclopädie der technischen Chemie [Ullmann's Encyclopedia of Industrial Chemistry] vol. 12, Verlag Chemie Weinheim, 1976, pages 547 to 555.

The reaction in processes according to the present invention is preferably conducted in a basic medium. Catalysts used for the polycondensation are especially strongly basic compounds. Basic catalysts usable with preference are, for example, alkali metal hydroxides and alkali metal methoxides, for example potassium hydroxide, sodium hydroxide, potassium methoxide or sodium methoxide. Further basic catalysts usable with preference are quaternary ammonium compounds such as tetramethylammonium hydroxide, tetraethylammonium hydroxide or tetrabutylammonium hydroxide.

The basic catalysts are used especially in amounts of ≥0.025 mol %, preferably ≥0.05 mol %, and especially in amounts of ≥0.10 mol %, based on the ketone, in the reaction mixture.

In a further preferred embodiment of the present invention, in the processes according to the invention, a phase transfer catalyst of the general formula

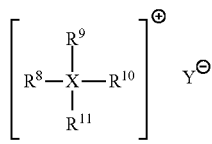

is used, where X is a nitrogen or phosphorus atom, $R^8$ is a phenyl or benzyl radical, $R^9$, $R^{10}$, $R^{11}$ are the same or different and may be selected from alkyl radicals having 1 to 22 carbon atoms in the carbon chain, phenyl or benzyl radicals, and Y is the anion of an inorganic or organic acid or a hydroxide ion.

In the case of quaternary ammonium salts, $R^9$, $R^{10}$, $R^{11}$ are especially alkyl radicals having 1 to 22 carbon atoms, especially those having 1 to 12 carbon atoms, in the carbon chain and/or phenyl radicals and/or benzyl radicals. Examples of quaternary ammonium salts are cetyldimethylbenzylammonium chloride, tributylbenzylammonium chloride, trim ethylbenzylammonium chloride, trimethylbenzylammonium iodide, triethylbenzylammonium chloride or triethylbenzylammonium iodide. Useful quaternary phosphonium salts include, for example, triphenylbenzylphosphonium chloride or triphenylbenzylphosphonium iodide. Preference is given to using benzyltributylammonium chloride. For quaternary phosphonium salts, $R^9$, $R^{10}$, $R^{11}$ are preferably alkyl radicals having 1 to 22 carbon atoms and/or phenyl radicals and/or benzyl radicals. Useful anions include those of strong inorganic or organic acids, especially Cl—, Br—, I— anions, but also hydroxides, methoxides or acetates.

The phase transfer catalyst is preferably used in the processes according to the invention in amounts of 0.01% to 15% by mass, preferably of 0.1% to 10.0% by mass and especially in amounts of 0.1% to 5.0% by mass, based on the ketone used.

The reaction may additionally take place in an auxiliary solvent. Suitable solvents have been found, for example, to be methanol or ethanol. However, it is also possible to use auxiliary solvents which can likewise be converted during the reaction. One example of these is methyl ethyl ketone. More preferably, the condensation according to the present invention is effected in the presence of methanol and/or ethanol. Some of the above alcohols suitable for the functionalization are themselves compatible with water, for example, and so it is possible to dispense with the use of the aforementioned auxiliary solvents.

In addition, it is also possible to add solubilizers between the nucleophilic component, i.e. the alcohol used for functionalization, and the aqueous reaction mixture, for example by use of 1,4-dioxane, but also polymeric solubilizers.

The reaction takes place at temperatures between 40° C. and 120° C., more preferably between 60° C. and 95° C.

By varying the ratios of aldehyde and ketone within the limits of the present invention, it is possible to adjust resin properties such as glass transition temperature and molar mass.

In a particularly preferred embodiment of the present invention, the aldehyde used is 30% aqueous formaldehyde solution and the ketone used is methyl isobutyl ketone. The preferred molar ratio of ketone to aldehyde in this embodiment is 1:1.9 to 1:2.1. In the preferred embodiment, the phase transfer catalyst used is benzyltributylammonium chloride. The preferred amount of benzyltributylammonium chloride used is 0.1% to 0.5% by mass based on methyl isobutyl ketone. In the preferred embodiment, the alcohol used for functionalization is N,N-dimethylaminoethanol. The preferred molar ratio of N,N-dimethylaminoethanol to methyl isobutyl ketone is 1:1 to 2:1. The basic catalyst used is preferably sodium hydroxide solution as a 50% by weight solution in a preferred amount greater than 0.15 mol %, based on methyl isobutyl ketone. The condensation preferably takes place without use of any further auxiliary solvent. The product can be worked up in the manner known to the person skilled in the art, by distillation, separation and/or washing operations.

If necessary, a suitable catalyst can be used for preparation of the inventive resins. All compounds which accelerate incorporation of the alcohol into the polymer chain and are known in the literature are suitable. Examples thereof are amines, for example 4-N,N-dimethylaminopyridine or compounds bearing amidine or guanidine groups, for example the compound 1,8-diazabicyclo[5.4.0]undec-7-ene (DBU).

The present invention likewise provides functionalized resins obtainable by the process described above.

The inventive resins generally have glass transition temperatures of −80° C. to +140° C., preferably of −70° C. to +120° C., determined in accordance with DIN 53765.

The inventive resins have relative molar masses between 200 and 20000 g/mol, preferably between 300 and 10000 g/mol, more preferably between 350 and 5000 g/mol.

The relative molar masses are determined by size exclusion chromatography (SEC). For this purpose, three columns from Merck (PS 400, 250*7 mm, PS 40, 250*7 mm, and PS 1, 250*7 mm) with a particle size of 5 μm are combined in series. After calibration, 20 μl of the condensation resin solution in tetrahydrofuran ($c_{condensation\ resin}$=20 mg/ml) are injected at 40° C. with a Rheodyne 7125 injector and analyzed at a flow rate of 1 ml/min (Waters 510 HPLC pump) at 40° C. with degassed tetrahydrofuran as mobile phase and a differential refractometer at 40° C. (Waters model 410). Evaluation is made after calibration against polystyrene standards, which is carried out in the manner described above. Polystyrene standards (standard 1 Mp 377400, Mp 96000, Mp 20650, Mp 1300, Mp 162; standard 2 Mp 283300, Mp 50400, Mp 10850, Mp 2930, Mp 980; standard 3 Mp 218800, Mp 68900, Mp 10050, Mp 1940, Mp 580; Mp=molar mass at peak maximum) are commercially available, for example, from Merck or Polymer Laboratories.

The inventive resins can be converted to carbonyl-hydrogenated resins using suitable catalysts which allow the hydrogenation of the carbonyl group. A suitable process for this purpose is described in DE 870022. If the ketone-aldehyde resin contains aromatic components, it is possible through use of suitable catalysts to prepare ring- and carbonyl-hydrogenated resins, as described, for example, in DE102006026758. The hydrogenation of the carbonyl groups leads to introduction of (further) hydroxyl functionalities. It is possible by the partial or complete carbonyl hydrogenation of the ketone-aldehyde resins to adjust the profile of properties of the resins, for example the solubility properties in polar and nonpolar solvents.

The functionalized resins obtained can be used in coating applications, the coating applications especially being paints, varnishes or pigment pastes.

The functionalized resins obtained are especially suitable for use in printing inks. It has been found here that the use of the inventive resins allows an improvement in properties of the prints to be achieved. Improvements in properties are achieved, for example, in the adhesion of the coating to the substrate or in gloss.

Resins which have been functionalized by the use of unsaturated alcohols having reactive double bonds are suitable for use as free-radically curable resins. Such resins can be cured using thermal initiators, for example azobisisobutyronitrile, or photoinitiators, optionally in the presence of suitable photosensitizers, by irradiation. This converts the resins to polymeric insoluble resins which, according to the content of unsaturated groups, gives elastomers to thermosets.

The present invention further provides for the use of the inventive resins as pigment wetting resins and/or dispersing resins, where the pigments are especially in solvent borne pigment pastes. Therefore, the inventive resins are suitable as grinding resins for solids dispersions, for example based on fillers or pigments.

Compositions comprising resins according to the present invention likewise form part of the subject-matter of the present invention. More particularly, the inventive compositions additionally contain pigments. In a particularly preferred embodiment, the compositions consist of resins according to the present invention and pigments.

Preferred solids are fillers, for example talc, kaolin, silicas, barytes and lime; ceramic materials, for example aluminium oxides, silicates, zirconium oxides, titanium oxides, boron nitrides, silicon nitrides, boron carbides, mixed silicon aluminium nitrides and metal titanates; magnetic materials, for example magnetic oxides of transition metals, such as iron oxides, cobalt-doped iron oxides and ferrites; metals, for example iron, nickel, cobalt and alloys thereof, and biocide, agrochemicals and pharmaceuticals, for example fungicides.

Further preferred solids are inorganic and organic pigments. Examples of inorganic pigments are carbon blacks, titanium dioxides, zinc oxides, Prussian blue, iron oxides, cadmium sulphides, chromium pigments, for example chromates, molybdates and mixed chromates and sulphates of lead, zinc, barium, calcium and mixtures thereof. Further examples of inorganic pigments are specified in the book "H. Endriss, Aktuelle anorganische Bunt-Pigmente [Inorganic Colour Pigments Today], Vincentz Verlag, Hannover (1997)". Examples of organic pigments are those from the group of the azo, diazo, condensed azo, naphthol, metal complex, thioindigo, indanthrone, isoindanthrone, anthanthrone, anthraquinone, isodibenzanthrone, triphendioxazine, quinacridone, perylene, diketopyrrolopyrrole and phthalocyanine pigments. Further examples of organic pigments are specified in the book "W. Herbst, K. Hunger, Industrial Organic Pigments, VCH, Weinheim (1993)".

It has been found that there is broad compatibility of the inventive resins with further constituents, preferably binders, of coating materials and/or adhesives and/or sealing compounds. Useful coating materials into which the inventive pigment preparations can be introduced with preference include all the solvent-containing and solvent-free systems known to those skilled in the art. These systems may, for example, be physically drying systems, oxidatively drying systems or systems that are reactive in another way in one-part or two-part varnishes.

Examples of binders are long-, medium- and short-oil alkyds, self-crosslinking and 2-part acrylates, polyester-melamine systems, 2-part polyurethanes and 2-part epoxides.

Therefore, the present invention likewise provides for the use of compositions according to the present invention for production of varnishes and printing inks or printing varnishes and coating materials.

The test methods described above apply to all the embodiments of the present invention. Even in the absence of further information it is assumed that a person skilled in the art can make very extensive use of the above description. The preferred embodiments and examples are therefore to be interpreted merely as descriptive disclosure, and certainly not as disclosure that is in any way limiting.

The present invention is explained in more detail below with reference to examples. Alternative embodiments of the present invention are obtainable analogously.

Having generally described this invention, a further understanding can be obtained by reference to certain specific examples which are provided herein for purposes of illustration only, and are not intended to be limiting unless otherwise specified.

Test Methods:

Parameters or measurements were preferably determined using the methods described hereinafter. Any further methods can be found in the description.

OH numbers were determined in accordance with DIN 53240-2. In this method, the sample was reacted with acetic anhydride in the presence of 4-dimethylaminopyridine as catalyst, acetylating the hydroxyl groups. This formed one molecule of acetic acid per hydroxyl group, while the subsequent hydrolysis of the excess acetic anhydride afforded two molecules of acetic acid. The consumption of acetic acid was determined by titrimetric means from the difference between the main value and a blank value conducted in parallel.

The viscosities reported were determined with an Anton Paar M102 rotary viscometer with the CP50/2 measurement geometry at 23° C. and a shear rate of $1/100$ s. For this purpose, a mixture of butyl acetate and methoxypropyl acetate in a ratio of 1:1 parts by mass was made up. 80% by weight of the resins were dissolved in the butyl acetate/methoxypropyl acetate mixture. The production of a solution can be accelerated by heating the resine-solvent mixture up to 70° C. The resin solutions obtained were subjected to the viscosity measurement by the previously specified method.

Amine numbers were determined in accordance with DIN 53176. This is a potentiometric titration. The amine number indicates the amount of KOH in mg which is required theoretically to neutralize the amount of hydrochloric acid that neutralizes 1 g of the sample to be analyzed.

Iodine numbers were determined in accordance with DIN 53241-1. The iodine number describes the amount of iodine in grams which can be added in a formal sense onto 100 g of the substance to be analyzed. The iodine number is therefore a measure of the unsaturated character of a substance.

Example 1—Condensation Resin of Formaldehyde, Methyl Isobutyl Ketone and 2-Allyloxyethanol 100.2 g of methyl isobutyl ketone, 100.1 g of formaldehyde solution (30% by weight in water) and 234.9 g of 2-allyloxyethanol were initially charged in a three-neck flask with stirrer, reflux condenser and temperature probe in a nitrogen atmosphere. After heating to 40° C., the reaction was started by adding 20.0 g of sodium hydroxide solution (50% by weight). Subsequently, the reaction mixture was heated up to reflux. On attainment of reflux, 100.1 g of a formaldehyde solution (30% by weight in water) were added within 90 minutes, then the reaction mixture was kept under reflux for 4.5 hours. Then the stirrer was switched off After separation of the phases, the aqueous phase was removed. The crude product was washed three times with water, with addition of 1 ml of glacial acetic acid to the first wash water. Finally, the mixture was distilled on a rotary evaporator at 165° C. and 40 mbar for 60 min. The iodine number indicates the formation of an ene-functionalized condensation resin.

Iodine number 36 g of iodine/100 g
Signals at 5.2 and 5.8 ppm in the 1H NMR spectrum, measured in $CDCl_3$, indicate the formation of the unsaturated component.
Mn=570 g/mol
Mw=730 g/mol
OH number 12 mg KOH/g
Glass transition temperature −31° C.

Example 2—Condensation Resin of Formaldehyde, Methyl Isobutyl Ketone and N,N-dimethylethanolamine 300.5 g of methyl isobutyl ketone, 298.3 g of formaldehyde solution (30.2% by weight in water), 507 g of dimethylethanolamine and 0.75 g of benzyltributylammonium chloride were initially charged in a three-neck flask with stirrer, reflux condenser and temperature probe in a nitrogen atmosphere. After heating to 40° C., the reaction was started by adding 60.0 g of sodium hydroxide solution (50% by weight). Subsequently, the reaction mixture was heated up to reflux. On attainment of reflux, 298.3 g of a formaldehyde solution (30.2% by weight in water) were added within 90 minutes, then the reaction mixture was kept under reflux for 4.5 hours. Then the stirrer was switched off After separation of the phases, the aqueous phase was removed. The crude product was washed 16 times with water, with addition of 30 ml of glacial acetic acid to the first wash water. Finally, the mixture was distilled on a rotary evaporator at 165° C. and 40 mbar for 60 min. An amine-functionalized resin was obtained.

Amine number: 27 mg KOH/g
Mn=620 g/mol
Mw=910 g/mol
OH number 16.6 mg KOH/g
Glass transition temperature 14° C.
Viscosity (80% by weight in butyl acetate/methoxypropyl acetate) at 23° C.: 3529 mPas

Example 3—Condensation Resin of Formaldehyde, Methyl Isobutyl Ketone and Glycerol 400.6 g of methyl isobutyl ketone, 397.7 g of formaldehyde solution (30.2% by weight in water), 914.3 g of glycerol and 1 g of benzyltributylammonium chloride were initially charged in a three-neck flask with stirrer, reflux condenser and temperature probe in a nitrogen atmosphere. After heating to 40° C., the reaction was started by adding 80.0 g of sodium hydroxide solution (50% by weight). Subsequently, the reaction mixture was heated up to reflux. On attainment of reflux, 397.7 g of a formaldehyde solution (30.2% by weight in water) were added within 90 minutes, then the reaction mixture was kept under reflux for 4.5 hours. Then the stirrer was switched off. After separation of the phases, the aqueous phase was removed. The crude product was washed four times with water, with addition of 2 ml of glacial acetic acid to the first wash water. Finally, the mixture was distilled on a rotary evaporator at 165° C. and 40 mbar for 60 min. An OH-functional condensation resin was obtained.

OH number 134.8 mg KOH/g
Mn=510 g/mol
Mw=630 g/mol
Glass transition temperature −15° C.
Viscosity (80% by weight in butyl acetate/methoxypropyl acetate) at 23° C.: 664 mPas
OH number 75.1 mg KOH/g

Example 4—Condensation Resin of Formaldehyde, Methyl Isobutyl Ketone and N,N-Dimethylethanolamine in the Presence of DBU 150.2 g of methyl isobutyl ketone, 148.7 g of formaldehyde solution (30.3% by weight in water), 7.5 g of DBU and 0.38 g of benzyltributylammonium chloride were initially charged in a three-neck flask with stirrer, reflux condenser and temperature sensor in nitrogen atmosphere. Subsequently, 332.3 g of N,N-dimethylethanolamine were added dropwise with slight exothermicity. After heating to 40° C., the reaction was started by adding 30.0 g of sodium hydroxide solution (50% by weight). Subsequently, the reaction mixture was heated to reflux. On attainment of reflux, 148.7 g of a formaldehyde solution (30.3% by weight in water) were added within 90 minutes, then the reaction mixture was kept under reflux for 4.5 hours. Then the stirrer was switched off. After the phases had separated, the aqueous phase was removed. The crude product was washed eleven times with water, with addition of 8 ml of glacial acetic acid to the first wash water. Finally, distillation was effected at 165° C. and mbar on a rotary evaporator for 60 min. An amine-functionalized resin was obtained.

Amine number: 41 mg KOH/g
Mn=680 g/mol
Mw=950 g/mol
OH number 13.6 mg KOH/g
Glass transition temperature 22° C.
Viscosity (80% by weight in butyl acetate/methoxypropyl acetate) at 23° C.: 7814 mPas

Example 5—Condensation Resin of Paraformaldehyde, Methyl Isobutyl Ketone and N,N-Dimethylethanolamine 147.3 g of p-formaldehyde (95.8% by weight) and 211.7 g of N,N-dimethylethanolamine were initially charged in a three-neck flask with stirrer, reflux condenser and temperature sensor in nitrogen atmosphere. After heating to 50° C., the reaction was started by adding 55.0 g of sodium hydroxide solution (50% by weight). Subsequently, 250.4 g of methyl isobutyl ketone were added dropwise, then 20.0 g of sodium hydroxide solution (50% by weight) were added dropwise. Thereafter, the reaction mixture was kept under reflux for 4.5 hours, then 410 ml of water were added and the mixture was stirred for five minutes. Then the stirrer was switched off. After the phases had separated, the aqueous phase was removed. The crude product was washed six times with water, with addition of 8 ml of glacial acetic acid to the first wash water. Finally, distillation was effected at 165° C. and 40 mbar on a rotary evaporator for 60 min. An amine-functionalized resin was obtained.

Amine number: 31.2 mg KOH/g
Mn=700 g/mol
Mw=1100 g/mol
OH number 3.8 mg KOH/g
Glass transition temperature 27° C.
Viscosity (80% by weight in butyl acetate/methoxypropyl acetate) at 23° C.: 15052 mPas Example 6—Condensation Resin of Paraformaldehyde, Methyl Isobutyl Ketone and N,N-Dimethylethanolamine in the Presence of DBU 147.3 g of p-formaldehyde (95.8% by weight), 12.5 g of DBU and 211.7 g of N,N-dimethyl ethanol amine were initially charged in a three-neck flask with stirrer, reflux condenser and temperature sensor in nitrogen atmosphere. After heating to 50° C., the reaction was started by adding 55.0 g of sodium hydroxide solution (50% by weight). Subsequently, 250.4 g of methyl isobutyl ketone were added dropwise, then 20.0 g of sodium hydroxide solution (50% by weight) were added dropwise. Thereafter, the reaction mixture was kept under reflux for 4.5 hours, then 410 ml of demineralized water were added and the mixture was stirred for five minutes. Then the stirrer was switched off. After the phases had separated, the aqueous phase was removed. The crude product was washed eight times with water, with addition of 8 ml of glacial acetic acid to the first wash water and 2 ml of glacial acetic acid in the fifth wash water. Finally, distillation was effected at 165° C. and 40 mbar on a rotary evaporator for 60 min. An amine-functionalized resin was obtained.

Amine number: 38.2 mg KOH/g
Mn=690 g/mol
Mw=1000 g/mol
OH number 11.0 mg KOH/g
Glass transition temperature 24° C.
Viscosity (80% by weight in butyl acetate/methoxypropyl acetate) at 23° C.: 11081 mPas Example 7—Condensation Resin of Formaldehyde, Methyl Isobutyl Ketone and Methyldiethanolamine 300.5 g of methyl isobutyl ketone, 303.3 g of formaldehyde solution (29.7% by weight in water) and 0.75 g of benzyltributylammonium chloride were initially charged in a three-neck flask with stirrer, reflux condenser and temperature sensor in nitrogen atmosphere. Subsequently, 376.4 g of methyldiethanolamine were added dropwise with slight exothermicity. After heating to 40° C., the reaction was started by adding 60.0 g of sodium hydroxide solution (50% by weight). Subsequently, the reaction mixture was heated to reflux. On attainment of reflux, 303.3 g of a formaldehyde solution (29.7% by weight in water) were added within 90 minutes, then the reaction mixture was kept under reflux for 4.5 hours. Then the stirrer was switched off. After the phases had separated, the aqueous phase was removed. The crude product was washed six times with water, with addition of 6 ml of glacial acetic acid to the second wash water. Finally, distillation was effected at 165° C. and 40 mbar on a rotary evaporator for 60 min. An amine-functionalized resin was obtained.

Amine number: 43.5 mg KOH/g
Mn=550 g/mol
Mw=770 g/mol
OH number 54 mg KOH/g
Glass transition temperature −1° C.
Viscosity (80% by weight in butyl acetate/methoxypropyl acetate) at 23° C.: 1662 mPas Example 8—Condensation Resin of Formaldehyde, Methyl Isobutyl Ketone, Acetone, Methyl Ethyl Ketone (MEK) and N,N-Dimethylethanolamine 180.3 g of methyl isobutyl ketone, 303.3 g of formaldehyde solution (29.7% by weight in water), 34.8 g of acetone, 43.3 g of methyl ethyl ketone and 0.75 g of benzyltributylammonium chloride were initially charged in a three-neck flask with stirrer, reflux condenser and temperature sensor in nitrogen atmosphere. Subsequently, 507 g of N,N-dimethylethanolamine were added dropwise with slight exothermicity. After heating to 40° C., the reaction was started by adding 60.0 g of sodium hydroxide solution (50% by weight). Subsequently, the reaction mixture was heated to reflux. On attainment of reflux, 303.3 g of a formaldehyde solution (29.7% by weight in water) were added within 90 minutes, then the reaction mixture was kept under reflux for 4.5 hours. Then the stirrer was switched off. After the phases had separated, the aqueous phase was removed. The crude product was washed six times with water, with addition of 6 ml of glacial acetic acid to the second wash water. Finally, distillation was effected at 165° C. and 40 mbar on a rotary evaporator for 60 min. An amine-functionalized resin was obtained.

Amine number: 40.0 mg KOH/g
Mn=720 g/mol
Mw=1100 g/mol
OH number 24 mg KOH/g
Glass transition temperature 45° C.
Viscosity (80% by weight in butyl acetate/methoxypropyl acetate) at 23° C.: 5921 mPas Example 9—Condensation Resin of Formaldehyde, Methyl Isobutyl Ketone and Trimethylaminoethylethanolamine 146.2 g of methyl isobutyl ketone, 147.8 g of formaldehyde solution (29.7% by weight in water) and 0.37 g of benzyltributylammonium chloride were initially charged in a three-neck flask with stirrer, reflux condenser and temperature sensor in nitrogen atmosphere. Subsequently, 203.0 g of trimethylaminoethylethanolamine were added dropwise with slight exothermicity. After heating to 40° C., the reaction was started by adding 29.2 g of sodium hydroxide solution (50% by weight). Subsequently, the reaction mixture was heated to reflux. On attainment of reflux, 147.8 g of a formaldehyde solution (29.7% by weight in water) were added within 90 minutes, then the reaction mixture was kept under reflux for 4.5 hours. Then the stirrer was switched off. After the phases had separated, the aqueous phase was removed. The crude product was washed ten times with water, with addition of 4 ml of glacial acetic acid to the second wash water and of 2 ml to the seventh wash water. Finally, distillation was effected at 165° C. and 40 mbar on a rotary evaporator for 60 min. An amine-functionalized resin was obtained.

Amine number: 20.2 mg KOH/g
Mn=640 g/mol
Mw=920 g/mol
OH number 17 mg KOH/g
Glass transition temperature 19° C.
Viscosity (80% by weight in butyl acetate/methoxypropyl acetate) at 23° C.: 169034 mPas Example 10—Condensation Resin of Formaldehyde, Methyl Isobutyl Ketone, 2-Heptanone, 3-Octanone, Methyl Ethyl Ketone (MEK) and N,N-Dimethylethanolamine 180.3 g of methyl isobutyl ketone, 303.3 g of formaldehyde solution (29.7% by weight in water), 68.5 g of 2-heptanone, 76.9 g of 3-octanone and 0.75 g of benzyltributylammonium chloride were initially charged in a three-neck flask with stirrer, reflux condenser and temperature sensor in nitrogen atmosphere. Subsequently, 507 g of N,N-dimethylethanolamine were added dropwise with slight exothermicity. After heating to 40° C., the reaction was started by adding 60.0 g of sodium hydroxide solution (50% by weight). Subsequently, the reaction mixture was heated to reflux. On attainment of reflux, 303.3 g of a formaldehyde solution (29.7% by weight in water) were added within 90 minutes, then the reaction mixture was kept under reflux for 4.5 hours. Then the stirrer was switched off. After the phases had separated, the aqueous phase was removed. The crude product was washed ten times with water, with addition of 8 ml of glacial acetic acid to the second wash water and of 2 ml each to the fifth, seventh and eighth wash water. Finally, distillation was effected at 165° C. and 40 mbar on a rotary evaporator for 60 min. An amine-functionalized resin was obtained.

Amine number: 22.0 mg KOH/g
Mn=560 g/mol
Mw=750 g/mol
OH number 14 mg KOH/g
Glass transition temperature −12° C.
Viscosity (80% by weight in butyl acetate/methoxypropyl acetate) at 23° C.: 748 mPas Comparative Example—Condensation Resin of Formaldehyde, Methyl Ethyl Ketone and Ethylene Glycol 250.4 g of methyl isobutyl ketone, 247.8 g of formaldehyde solution (30.3% by weight in water), 775.8 g of ethylene glycol and 0.63 g of benzyltributylammonium chloride were initially charged in a three-neck flask with stirrer, reflux condenser and temperature sensor in nitrogen atmosphere. After heating to 40° C., the reaction was started by adding 50.0 g of sodium hydroxide solution (50% by weight). Subsequently, the reaction mixture was heated to reflux. On attainment of reflux, 247.8 g of a formaldehyde solution (30.3% by weight in water) were added within 90 minutes, then the reaction mixture was kept under reflux for 4.5 hours. Then the stirrer was switched off. After the phases had separated, the aqueous phase was removed. The crude product was washed ten times with water, with addition of 2.5 ml of glacial acetic acid to the second wash water. Finally, distillation was effected at 165° C. and 40 mbar on a rotary evaporator for 30 min. An OH-functionalized resin was obtained.

Mn=540 g/mol
Mw=680 g/mol
OH number 73 mg KOH/g
Glass transition temperature −6° C.
Viscosity (80% by weight in butyl acetate/methoxypropyl acetate) at 23° C.: 803 mPas Use Example Varnish Production a) Production of a Premix Wax Dilution First of all, a Premix Wax Dilution was produced (Table 1). For this purpose, Ecocell 1/4 AS (28.6% in ethyl acetate, from Nitroquimica, 38 g), Vestowax H2050 SF (30 g, from Evonik Industries AG) and ethanol (32 g) were mixed successively in a 250 ml glass bottle using a dissolver (Dispermat LC 75, VMA Getzmann). After addition of the components, the Premix Wax Dilution was dispersed at a stirrer speed of 2500-3000 rpm for 2 hours.

TABLE 1

| Premix Wax Dilution | |
| --- | --- |
| Component | Composition in % |
| Ecocell 1/4 AS (28.6% in ethyl acetate) | 38 |
| Vestowax H 2050 SF | 30 |
| Ethanol | 32 |
| Sum total | 100 | b) Production of Nitrocellulose Varnishes b1) Inventive Varnish

The amine-functionalized resin from Example 2 (4.0 g) was dissolved in ethyl acetate (10.3 g) in a 250 ml glass bottle. Subsequently, Ecocell 1/4 AS (28.6% in ethyl acetate, 18.70 g), Tego Dispers 710 (4.00 g, from Evonik Industries AG), ethanol (7.00 g), Hexamoll DINCH (4.5 g, BASF SE) and the pigment Special Black 4 (10.0 g, Orion) were added to the solution of the resin from Example 2. Thereafter, about 59 g of Ø 3 mm glass beads were added, and the bottle was sealed well and placed into the shaker. The varnish was shaken for 1 hour. (Step 1, Table 2)

This was followed by another weighing-in of Ecocell 1/4 AS (28.6% in ethyl acetate) (11.3 g), ethyl acetate (3.70 g), Premix Wax Dilution (6.70 g), ethanol (13.3 g) and methoxypropanol (6.50 g). The bottle was again sealed well and mixed on a shaker for 15 minutes. The varnish was separated from the glass beads with the aid of a high-speed sieve and applied the next day. (Step 2, Table 2)

b2) Comparative Varnish

For comparative purposes, the resin according to the comparative example was made up by the same procedure.

b3) Comparative Varnish without Resin

Likewise for comparative purposes, a nitrocellulose varnish lacking inventive resin was made up by the same procedure. For production of a comparative sample having equivalent resin content, the amounts of Ecocell 1/4 AS and ethyl acetate in step 1 were adjusted correspondingly.

The amounts of the components used are summarized in Table 2.

TABLE 2

Compositions of the nitrocellulose varnishes

| Component | Comparative varnish lacking resin Composition in % | Inventive varnish Composition in % | Comparative varnish Composition in % |
|---|---|---|---|
| Step 1 | | | |
| Ecocell 1/4 AS (28% in ethyl acetate) | 32.7 | 18.7 | 18.7 |
| TEGO Dispers 710 | 4 | 4 | 4 |
| Ethanol | 7 | 7 | 7 |
| Resin according to Example 2 | 0 | 4 | 0 |
| Resin according to comparative example | 0 | 0 | 4 |
| Special Black | 10 | 10 | 10 |
| Ethyl acetate | 0.3 | 10.3 | 10.3 |
| Hexamoll DINCH | 4.5 | 4.5 | 4.5 |
| Step 2 | | | |
| Ecocell 1/4 AS (28.6% in ethyl acetate) | 11.3 | 11.3 | 11.3 |
| Ethyl acetate | 3.7 | 3.7 | 3.7 |
| Premix wax dilution | 6.7 | 6.7 | 6.7 |
| Ethanol | 13.3 | 13.3 | 13.3 |
| Methoxypropanol | 6.5 | 6.5 | 6.5 |
| Sum total | 100 | 100 | 100 |

Application:

An untreated PP film was treated in a corona unit (Arcotec, Monsheim, CG061-2 corona generator). Subsequently, about 1 g of the varnish was placed onto the corona-treated film and applied with a 13.7 μm coating bar. The drying time of the varnish was 1-2 minutes.

After 5 minutes, the adhesive tape resistance was determined in order to assess the coating for its bonding capacity. The customary method on the market for determining the adhesive tape resistance is based on ASTM D3359 and is conducted as follows. The coated PP film is placed onto a hard smooth substrate. A strip of Tesa adhesive tape (4104 type, Beiersdorf, width 20 mm, length at least 30 mm) is stuck onto the specimen transverse to running direction and pressed on uniformly. Immediately after being stuck on, the adhesive strip is pulled off sharply at an angle of 90°. The adhesive tape resistance is rated by numbers from 1 to 5:

5=coating not pulled off
4=a few spots of coating pulled off
3=individual distinct areas of coating pulled off
2=larger areas of coating pulled off
1=coating pulled off completely After two hours of drying time, gloss was measured in accordance with DIN EN ISO 2813. The gloss results reported in gloss units (GE) are likewise summarized in Table 3.

The results are compiled in Table 3.

TABLE 3

Evaluation of the PP films

| | PP film after coating with comparative varnish lacking resin | PP film after coating with inventive varnish | PP film after coating with comparative varnish |
|---|---|---|---|
| Gloss at 20° [GE] | 1.5 | 1.8 | 1.7 |
| Gloss at 60° [GE] | 15.7 | 19.4 | 14.6 |
| Gloss at 85° [GE] | 25.7 | 38.3 | 21 |
| Adhesive tape resistance | 1 | 4 | 1 |

The inventive resin featured an improvement in adhesion and an increase in gloss values.

European patent application EP15162343.6 filed Apr. 2, 2015, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A process for preparing a functionalized resin, comprising:
    condensing a ketone selected from the group consisting of: acetone; acetophenone; ortho-, meta- or para-phenylacetophenone; methyl ethyl ketone; 3-pentanone; 2-heptanone; 3-heptanone; 4-heptanone; 2-octanone; 3-octanone; 2-undecanone; 5-methylhexan-2-one; 4-methylpentan-2-one; cyclopentanone; cyclododecanone; mixtures of 2,2,4- and 2,4,4-trimethylcyclopentanone; cycloheptanone; cyclooctanone; cyclohexanone; o-, m- or p-methoxyacetophenone; o-, m- or p-[N,N-dialkylaminophenyl]ethanone; alkyl-substituted cyclohexanones or diones or mixtures thereof
    and an aldehyde in the presence of at least one amino alcohol selected from the group consisting of: N,N-dimethylaminoethanol, trimethylaminoethylethanolamine, 3-dimethylaminopropan-1-ol, butyldiethanolamine, butylethanolamine, dibutylethanolamine, diethylethanolamine, ethylethanolamine, dimethylaminoethoxyethanol, methyldiethanolamine, N,N-dimethylisopropanolamine, N-methylethanolamine, diethanolamine, diisopropanolamine, triisopropanolamine, N-(2-hydroxyethyl)piperidine, diisopropanol-p-toluidine, N,N-di(2-hydroxyethyl)aniline, N-(2-hydroxyethyl)aniline, 2-(2-aminoethoxy)ethanol, 3-amino-1-propanol, 5-amino-1-pentanol, monoethanolamine, N-(2-aminoethyl)ethanolamine, isopropanolamine, 2,2'-(phenylamino)diethanol, 1-(2-hydroxyethyl)piperazine, 4-(2-hydroxyethyl)morpholine, or derivatives or mixtures thereof,
    wherein said aldehyde used is a 20% to 40% by weight aqueous formaldehyde solution, said amino alcohol is incorporated covalently into said resin and said condensation is conducted in situ.

2. The process according to claim 1, wherein a molar aldehyde to ketone ratio is in the range from 1:1 to 3.5:1.

3. The process according to claim 2, wherein said amino alcohol further comprises at least one alcohol selected from the group consisting of methanol, ethanol and polyvalent alcohols having 2 to 6 carbon atoms and/or phenol.

4. The process according to claim 3, wherein 0.1 to 10 mol of amino alcohol are used per mole of ketone.

5. The process according to claim 4, wherein condensing is affected in the presence of an alkaline catalyst at a temperature between 40° C. and 120° C.

6. The process according to claim 1, wherein the aldehyde used is 30% by weight of aqueous formaldehyde solution and the ketone used is methyl isobutyl ketone.

7. A functionalized resin, obtained by a process according to claim 1.

8. The functionalized resin according to claim 7, which has a glass transition temperature of −80° C. to +140° C., determined in accordance with DIN 53765.

9. A coating, comprising:
the functionalized resin according to claim 7.

10. A paint, a varnish or a pigment paste, comprising:
the functionalized resin according to claim 7.

11. The process according to claim 1, wherein said ketone is an alkyl-substituted cyclohexanone selected from the group consisting of 4-tert-amylcyclohexanone, 2-sec-butylcyclohexanone, 2-tert-butylcyclohexanone, 4-tert-butylcyclohexanone, 2-methylcyclohexanone and 3,3,5-trimethylcyclohexanone or diones or mixtures thereof.

* * * * *